(12) United States Patent
Zednicek et al.

(10) Patent No.: US 8,379,372 B2
(45) Date of Patent: Feb. 19, 2013

(54) HOUSING CONFIGURATION FOR A SOLID ELECTROLYTIC CAPACITOR

(75) Inventors: Stanislav Zednicek, Lanskroun (CZ); Martin Biler, Novy Jicin (CZ); Jan Petrzilek, Usti nad Orlici (CZ); Ivana Zednickova, Lanskroun (CZ)

(73) Assignee: AVX Corporation, Fountain Inn, SC (US)

( * ) Notice: Subject to any disclaimer, the term of this patent is extended or adjusted under 35 U.S.C. 154(b) by 165 days.

(21) Appl. No.: 13/081,982

(22) Filed: Apr. 7, 2011

(65) Prior Publication Data

US 2012/0257328 A1 Oct. 11, 2012

(51) Int. Cl.
*H01G 4/228* (2006.01)

(52) U.S. Cl. ........ 361/536; 361/535; 361/537; 361/523; 361/525; 361/528

(58) Field of Classification Search .......... 361/536, 361/516–517, 523–525, 528–529, 535, 537, 361/540–541
See application file for complete search history.

(56) References Cited

U.S. PATENT DOCUMENTS

| | | |
|---|---|---|
| 3,345,545 A | 10/1967 | Bourgault et al. |
| 3,922,773 A | 12/1975 | Marien et al. |
| 4,085,435 A | 4/1978 | Galvagni |
| 4,479,168 A | 10/1984 | Green, Jr. |
| 4,755,908 A | 7/1988 | Gardner |
| 4,910,645 A | 3/1990 | Jonas et al. |
| 4,945,452 A | 7/1990 | Sturmer et al. |
| 4,959,430 A | 9/1990 | Jonas et al. |
| 5,111,327 A | 5/1992 | Blohm et al. |
| 5,198,968 A | 3/1993 | Galvagni |
| 5,300,575 A | 4/1994 | Jonas et al. |
| 5,314,606 A | 5/1994 | Irie et al. |
| 5,357,399 A | 10/1994 | Salisbury |
| 5,394,295 A | 2/1995 | Galvagni et al. |
| 5,457,862 A | 10/1995 | Sakata et al. |
| 5,473,503 A | 12/1995 | Sakata et al. |

(Continued)

FOREIGN PATENT DOCUMENTS

| | | |
|---|---|---|
| EP | 1014400 A2 | 6/2000 |
| EP | 1014400 A3 | 6/2000 |

(Continued)

OTHER PUBLICATIONS

Search Report for GB1204311.3 dated Jul. 16, 2012, 3 pages.

(Continued)

*Primary Examiner* — Nguyen T Ha
(74) *Attorney, Agent, or Firm* — Dority & Manning, P.A.

(57) ABSTRACT

A capacitor assembly that is stable under extreme conditions is provided. More particularly, the assembly includes a capacitor element that is positioned within an interior cavity of a housing. The housing includes a base to which the capacitor element is connected. The housing also includes a lid that contains an outer wall from which extends a sidewall. An end of the sidewall is defined by a lip extending at an angle relative to the longitudinal direction and having a peripheral edge located beyond a periphery of the sidewall. The lip is hermetically sealed to the base. In some cases, the peripheral edge of the lip is also coplanar with an edge of the base. The use of such a lip can enable a more stable connection between the components and improve the seal and mechanical stability of the capacitor assembly, thereby allowing it to better function under extreme conditions.

21 Claims, 3 Drawing Sheets

U.S. PATENT DOCUMENTS

| | | | |
|---|---|---|---|
| 5,495,386 A | 2/1996 | Kulkarni | |
| 5,586,000 A | 12/1996 | Sakata et al. | |
| 5,608,261 A | 3/1997 | Bhattacharyya et al. | |
| 5,638,253 A | 6/1997 | Hasegawa | |
| 5,694,287 A | 12/1997 | Nishiyama et al. | |
| 5,729,428 A | 3/1998 | Sakata et al. | |
| 5,812,367 A | 9/1998 | Kudoh et al. | |
| 5,949,639 A | 9/1999 | Maeda et al. | |
| 5,951,840 A | 9/1999 | Fukaumi et al. | |
| 6,052,273 A | 4/2000 | Inoue et al. | |
| 6,188,566 B1 * | 2/2001 | Aoyama | 361/534 |
| 6,191,936 B1 | 2/2001 | Webber et al. | |
| 6,197,252 B1 | 3/2001 | Bishop et al. | |
| 6,322,912 B1 | 11/2001 | Fife | |
| 6,369,239 B2 | 4/2002 | Rauchschwalbe et al. | |
| 6,391,275 B1 | 5/2002 | Fife | |
| 6,416,730 B1 | 7/2002 | Fife | |
| 6,527,937 B2 | 3/2003 | Fife | |
| 6,528,662 B2 | 3/2003 | Jonas | |
| 6,576,099 B2 | 6/2003 | Kimmel et al. | |
| 6,592,740 B2 | 7/2003 | Fife | |
| 6,635,729 B1 | 10/2003 | Groenendaal et al. | |
| 6,639,787 B2 | 10/2003 | Kimmel et al. | |
| 6,674,635 B1 | 1/2004 | Fife et al. | |
| 6,756,473 B2 | 6/2004 | Reuter et al. | |
| 6,808,541 B2 * | 10/2004 | Maeda | 29/25.03 |
| 6,819,546 B2 * | 11/2004 | Kuriyama | 361/535 |
| 6,891,016 B2 | 5/2005 | Reuter et al. | |
| 6,987,663 B2 | 1/2006 | Merker et al. | |
| 7,102,016 B2 | 9/2006 | Reuter | |
| 7,116,548 B2 | 10/2006 | Satterfield, Jr. et al. | |
| 7,118,690 B2 | 10/2006 | Wessling et al. | |
| 7,139,163 B2 * | 11/2006 | Sawano | 361/540 |
| 7,154,740 B2 | 12/2006 | Merker et al. | |
| 7,220,397 B2 | 5/2007 | Kimmel et al. | |
| 7,262,511 B2 | 8/2007 | Osako et al. | |
| 7,279,015 B2 | 10/2007 | Merker | |
| 7,304,832 B2 | 12/2007 | Ushio et al. | |
| 7,312,979 B2 | 12/2007 | Ishizuka et al. | |
| 7,341,705 B2 | 3/2008 | Schnitter | |
| 7,341,801 B2 | 3/2008 | Reuter et al. | |
| 7,358,326 B2 | 4/2008 | Heuer et al. | |
| 7,377,947 B2 | 5/2008 | Merker et al. | |
| 7,381,396 B2 | 6/2008 | Thomas et al. | |
| 7,411,779 B2 | 8/2008 | Merker et al. | |
| 7,419,926 B2 | 9/2008 | Schnitter et al. | |
| 7,449,588 B2 | 11/2008 | Jonas et al. | |
| 7,515,396 B2 | 4/2009 | Biler | |
| 7,554,793 B2 * | 6/2009 | Chacko | 361/525 |
| 7,563,290 B2 * | 7/2009 | Qiu et al. | 29/25.03 |
| 7,582,958 B2 | 9/2009 | Brailey | |
| 7,585,983 B2 | 9/2009 | Reuter et al. | |
| 7,688,571 B2 | 3/2010 | Ishizuka et al. | |
| 7,697,265 B2 | 4/2010 | Umemoto et al. | |
| 7,750,099 B2 | 7/2010 | Chikusa et al. | |
| 7,760,490 B2 * | 7/2010 | Takatani et al. | 361/532 |
| 7,785,493 B2 | 8/2010 | Jonas et al. | |
| 2001/0012193 A1 | 8/2001 | Watanabe et al. | |
| 2003/0105207 A1 | 6/2003 | Kleyer et al. | |
| 2005/0065352 A1 | 3/2005 | Brassat et al. | |
| 2005/0167789 A1 | 8/2005 | Zhuang | |
| 2006/0035143 A1 | 2/2006 | Kida et al. | |
| 2006/0180797 A1 | 8/2006 | Merker et al. | |
| 2006/0260713 A1 | 11/2006 | Pyszczek et al. | |
| 2007/0064376 A1 | 3/2007 | Merker et al. | |
| 2008/0005878 A1 | 1/2008 | Merker et al. | |
| 2009/0030149 A1 | 1/2009 | Morita et al. | |
| 2009/0244812 A1 | 10/2009 | Rawal et al. | |
| 2009/0310285 A1 | 12/2009 | Reuter et al. | |
| 2009/0318710 A1 | 12/2009 | Brassat et al. | |
| 2010/0148124 A1 | 6/2010 | Reuter et al. | |
| 2010/0234517 A1 | 9/2010 | Plantenberg et al. | |
| 2010/0265634 A1 | 10/2010 | Freeman et al. | |
| 2011/0085285 A1 | 4/2011 | Zednicek et al. | |

FOREIGN PATENT DOCUMENTS

| | | |
|---|---|---|
| GB | 1069685 | 8/1965 |
| JP | 3 127813 | 5/1991 |
| JP | 11 112157 | 4/1999 |
| JP | 2005 217129 | 8/2005 |
| JP | 2006 278875 | 10/2006 |
| WO | WO 2009 030615 | 3/2009 |
| WO | WO 2009 043648 | 4/2009 |
| WO | WO 2009 047059 | 4/2009 |
| WO | WO 2009 135752 | 11/2009 |
| WO | WO 2009 141209 | 11/2009 |
| WO | WO 2010 003874 | 1/2010 |
| WO | WO 2010 015468 | 2/2010 |
| WO | WO 2010 089111 | 8/2010 |
| WO | WO 2010 102751 | 9/2010 |

OTHER PUBLICATIONS

Abstract of Japanese Patent No. JP1140621 dated Jun. 1, 1989.
Abstract of Japanese Patent No. JP3109712 dated May 9, 1991.
Abstract of Japanese Patent No. JP3109713 dated May 9, 1991.
Abstract of Japanese Patent No. JP3109714 dated May 9, 1991.
Machine Translation of JP2005217129.
Machine Translation of JP2006278875.
Material Safety Data Sheet from Dow Corning Corporation on 736 Heat Resistant/Sealant, Mar. 2, 2011, 8 pages.
Paper—Simpson et al., "Advances and Applications of Inherently Conductive Polymer Technologies Based on Poly(3,4-Ethylenedioxythiophene)," 2005 AIMCAL Fall Technical Conference and 19$^{th}$ International Vacuum Web Coating Conference, Oct. 16-20, 2005, Session 5: Advances in Technology, Myrtle Beach, SC, 10 pages.
Paper—Merker et al., "Conducting Polymer Dispersions for High-Capacitance Tantalum Capacitors,": CARTS Europe 2006, Sep. 2006, Bad Homburg, Germany, 6 pages.
Paper—Freeman et al., "Electrical Characterization of Polymer Tantalum Capacitors with Poly(3,4-Ethylenedioxythiophene) Cathode," Journal of the Electrochemical Society, vol. 156, No. 6, 2009, 10 pages.
Paper—Merker et al., "New Conducting Polymer Dispersions for Solid Electrolytic Capacitors," CARTS Europe 2005, Oct. 17-20, 2005, Prague, CZ Republic, 6 pages.
Paper—Young et al., "Performance and Reliability Study of High Voltage Tantalum Polymer Capacitors," 2010 Electronic Components Association, Inc., Arlington, VA; CARTS 2010 Conference Proceedings, CARTS 2010 Conference, New Orleans, LA, Apr. 2010, 13 pages.
Paper—Merker et al., "Tuning Conducting Polymer Dispersions for High-CV Tantalum Capacitors," CARTS Europe Oct. 29-Nov. 1, 2007, Barcelona, Spain, 6 pages.
Presentation—Freeman et al., "Hermetically Sealed Polymer Tantalum Capacitors," CMSE Europe 2010.
Product Information on Dow Corning® 736 Heat Resistant Sealant, 3 pages.
Product Information on Stycase™ 2651, General Purpose, Epoxy Encapsulant, from Emerson & Cuming, Jan. 22, 2007, 3 pages.
Related U.S. Patent Application Form.
Machine Translation of Japanese Patent No. 2005-039168 (Oct. 2, 2005) 17 pages.

* cited by examiner

HOUSING CONFIGURATION FOR A SOLID ELECTROLYTIC CAPACITOR

BACKGROUND OF THE INVENTION

Electrolytic capacitors (e.g., tantalum capacitors) are increasingly being used in the design of circuits due to their volumetric efficiency, reliability, and process compatibility. For example, one type of capacitor that has been developed is a solid electrolytic capacitor that includes an anode (e.g., tantalum), a dielectric oxide film (e.g., tantalum pentoxide, $Ta_2O_5$) formed on the anode, a solid electrolyte layer, and a cathode. The solid electrolyte layer may be formed from a conductive polymer, such as described in U.S. Pat. Nos. 5,457,862 to Sakata, et al., 5,473,503 to Sakata, et al., 5,729,428 to Sakata, et al., and 5,812,367 to Kudoh, et al. Unfortunately, however, the stability of such solid electrolytes is poor at high temperatures due to the tendency to transform from a doped to an un-doped state, or vice versa. In response to these and other problems, capacitors have been developed that are hermetically sealed to limit the contact of oxygen with the conductive polymer during use. U.S. Patent Publication No. 2009/0244812 to Rawal, et al., for instance, describes a capacitor assembly that includes a conductive polymer capacitor that is enclosed and hermetically sealed within a ceramic housing in the presence of an inert gas. The housing includes a lid that is welded to the sidewalls of a base structure. According to Rawal, et al., the ceramic housing limits the amount of oxygen and moisture supplied to the conductive polymer so that it is less likely to oxidize in high temperature environments, thus increasing the thermal stability of the capacitor assembly. Despite the benefits achieved, however, issues nevertheless remain. For example, the welding of the lid to the sidewalls can be problematic and lead to an imperfect seal where a small amount of moisture and/or oxygen can enter. While this is not a problem in all circumstances, it can become particularly troublesome under extreme conditions of high temperature (e.g., above about 175° C.) and high voltage (e.g., above about 35 volts).

As such, a need currently exists for a housing configuration that is capable of exhibiting improved hermetic sealing.

SUMMARY OF THE INVENTION

In accordance with one embodiment of the present invention, a capacitor assembly is disclosed that comprises a housing. The housing comprises a base extending in a lateral direction and a lid that overlies the base to define an interior cavity therebetween. The lid contains an outer wall and a sidewall extending in a longitudinal direction from the outer wall toward the base. A lip extends from the sidewall at an angle relative to the longitudinal direction and is hermetically sealed to the base. The lip has a peripheral edge located beyond a periphery of the sidewall. A capacitor element is positioned within the interior cavity and connected to the base of the housing. The capacitor element comprises an anode formed from an anodically oxidized, sintered porous body and a solid electrolyte overlying the anode. The assembly also comprises an anode termination that is in electrical connection with the anode body and a cathode termination that is in electrical connection with the solid electrolyte.

Other features and aspects of the present invention are set forth in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

Repeat use of references characters in the present specification and drawings is intended to represent same or analogous features or elements of the invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed to a capacitor assembly that is stable under extreme conditions. More particularly, the assembly includes a capacitor element that is positioned within an interior cavity of a housing. The housing includes a base to which the capacitor element is connected. The housing also includes a lid that contains an outer wall from which extends a sidewall. A lip extends from the sidewall that is hermetically sealed to the base. The lip has a peripheral edge located beyond a periphery of the sidewall. In some cases, the peripheral edge of the lip is also coplanar with an edge of the base. The use of such a lip can enable a more stable connection between the components and improve the seal and mechanical stability of the capacitor assembly, thereby allowing it to better function under extreme conditions.

Various embodiments of the present invention will now be described in more detail.

I. Capacitor Element

For high voltage applications, it is often desired that the anode of the capacitor element is formed from a powder having a relatively low specific charge, such as less than about 70,000 microFarads*Volts per gram ("µF*V/g"), in some embodiments about 2,000 µF*V/g to about 65,000 µF*V/g, and in some embodiments, from about 5,000 to about 50,000 µF*V/g. Of course, although powders of a low specific charge may sometimes be desired, it is by no means a requirement. Namely, the powder may also have a relatively high specific charge of about 70,000 microFarads*Volts per gram ("µF*V/g") or more, in some embodiments about 80,000 µF*V/g or more, in some embodiments about 90,000 µF*V/g or more, in some embodiments about 100,000 µF*V/g or more, and in some embodiments, from about 120,000 to about 250,000 µF*V/g.

The powder may contain a valve metal (i.e., metal that is capable of oxidation) or valve metal-based compound, such as tantalum, niobium, aluminum, hafnium, titanium, alloys thereof, oxides thereof, nitrides thereof, and so forth. For example, the valve metal composition may contain an electrically conductive oxide of niobium, such as niobium oxide having an atomic ratio of niobium to oxygen of 1:1.0±1.0, in some embodiments 1:1.0±0.3, in some embodiments 1:1.0±0.1, and in some embodiments, 1:1.0±0.05. For example, the niobium oxide may be $NbO_{0.7}$, $NbO_{1.0}$, $NbO_{1.1}$, and $NbO_2$. Examples of such valve metal oxides are described in U.S. Pat. Nos. 6,322,912 to Fife; 6,391,275 to Fife et al.;

6,416,730 to Fife et al.; 6,527,937 to Fife; 6,576,099 to Kimmel, et al.; 6,592,740 to Fife, et al.; and 6,639,787 to Kimmel, et al.; and 7,220,397 to Kimmel, et al., as well as U.S. Patent Application Publication Nos. 2005/0019581 to Schnitter; 2005/0103638 to Schnitter, et al.; 2005/0013765 to Thomas, et al., all of which are incorporated herein in their entirety by reference thereto for all purposes.

The particles of the powder may be flaked, angular, nodular, and mixtures or variations thereof. The particles also typically have a screen size distribution of at least about 60 mesh, in some embodiments from about 60 to about 325 mesh, and in some embodiments, from about 100 to about 200 mesh. Further, the specific surface area is from about 0.1 to about 10.0 $m^2/g$, in some embodiments from about 0.5 to about 5.0 $m^2/g$, and in some embodiments, from about 1.0 to about 2.0 $m^2/g$. The term "specific surface area" refers to the surface area determined by the physical gas adsorption (B.E.T.) method of Bruanauer, Emmet, and Teller, Journal of American Chemical Society, Vol. 60, 1938, p. 309, with nitrogen as the adsorption gas. Likewise, the bulk (or Scott) density is typically from about 0.1 to about 5.0 $g/cm^3$, in some embodiments from about 0.2 to about 4.0 $g/cm^3$, and in some embodiments, from about 0.5 to about 3.0 $g/cm^3$.

Other components may be added to the powder to facilitate the construction of the anode body. For example, a binder and/or lubricant may be employed to ensure that the particles adequately adhere to each other when pressed to form the anode body. Suitable binders may include camphor, stearic and other soapy fatty acids, Carbowax (Union Carbide), Glyptal (General Electric), polyvinyl alcohols, naphthalene, vegetable wax, and microwaxes (purified paraffins). The binder may be dissolved and dispersed in a solvent. Exemplary solvents may include water, alcohols, and so forth. When utilized, the percentage of binders and/or lubricants may vary from about 0.1% to about 8% by weight of the total mass. It should be understood, however, that binders and lubricants are not required in the present invention.

The resulting powder may be compacted using any conventional powder press mold. For example, the press mold may be a single station compaction press using a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. After compaction, the resulting anode body may then be diced into any desired shape, such as square, rectangle, circle, oval, triangle, hexagon, octagon, heptagon, pentagon, etc. The anode body may also have a "fluted" shape in that it contains one or more furrows, grooves, depressions, or indentations to increase the surface to volume ratio to minimize ESR and extend the frequency response of the capacitance. The anode body may then be subjected to a heating step in which most, if not all, of any binder/lubricant are removed. For example, the anode body is typically heated by an oven that operates at a temperature of from about 150° C. to about 500° C. Alternatively, the binder/lubricant may also be removed by contacting the pellet with an aqueous solution, such as described in U.S. Pat. No. 6,197,252 to Bishop, et al.

Once formed, the anode body is then sintered. The temperature, atmosphere, and time of the sintering may depend on a variety of factors, such as the type of anode, the size of the anode, etc. Typically, sintering occurs at a temperature of from about from about 800° C. to about 1900° C., in some embodiments from about 1000° C. to about 1500° C., and in some embodiments, from about 1100° C. to about 1400° C., for a time of from about 5 minutes to about 100 minutes, and in some embodiments, from about 30 minutes to about 60 minutes. If desired, sintering may occur in an atmosphere that limits the transfer of oxygen atoms to the anode. For example, sintering may occur in a reducing atmosphere, such as in a vacuum, inert gas, hydrogen, etc. The reducing atmosphere may be at a pressure of from about 10 Torr to about 2000 Torr, in some embodiments from about 100 Torr to about 1000 Torr, and in some embodiments, from about 100 Torr to about 930 Torr. Mixtures of hydrogen and other gases (e.g., argon or nitrogen) may also be employed.

An anode lead may also be connected to the anode body that extends in a lateral direction therefrom. The anode lead may be in the form of a wire, sheet, etc., and may be formed from a valve metal compound, such as tantalum, niobium, niobium oxide, etc. Connection of the lead may be accomplished using known techniques, such as by welding the lead to the body or embedding it within the anode body during formation (e.g., prior to compaction and/or sintering).

The anode is also coated with a dielectric. The dielectric may be formed by anodically oxidizing ("anodizing") the sintered anode so that a dielectric layer is formed over and/or within the anode. For example, a tantalum (Ta) anode may be anodized to tantalum pentoxide ($Ta_2O_5$). Typically, anodization is performed by initially applying a solution to the anode, such as by dipping anode into the electrolyte. A solvent is generally employed, such as water (e.g., deionized water). To enhance ionic conductivity, a compound may be employed that is capable of dissociating in the solvent to form ions. Examples of such compounds include, for instance, acids, such as described below with respect to the electrolyte. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the anodizing solution. If desired, blends of acids may also be employed.

A current is passed through the anodizing solution to form the dielectric layer. The value of the formation voltage manages the thickness of the dielectric layer. For example, the power supply may be initially set up at a galvanostatic mode until the required voltage is reached. Thereafter, the power supply may be switched to a potentiostatic mode to ensure that the desired dielectric thickness is formed over the entire surface of the anode. Of course, other known methods may also be employed, such as pulse or step potentiostatic methods. The voltage at which anodic oxidation occurs typically ranges from about 4 to about 250 V, and in some embodiments, from about 9 to about 200 V, and in some embodiments, from about 20 to about 150 V. During oxidation, the anodizing solution can be kept at an elevated temperature, such as about 30° C. or more, in some embodiments from about 40° C. to about 200° C., and in some embodiments, from about 50° C. to about 100° C. Anodic oxidation can also be done at ambient temperature or lower. The resulting dielectric layer may be formed on a surface of the anode and within its pores.

The capacitor element also contains a solid electrolyte that functions as the cathode for the capacitor. A manganese dioxide solid electrolyte may, for instance, be formed by the pyrolytic decomposition of manganous nitrate ($Mn(NO_3)_2$). Such techniques are described, for instance, in U.S. Pat. No. 4,945,452 to Sturmer, et al., which is incorporated herein in its entirety by reference thereto for all purposes.

Alternatively, the solid electrolyte may be formed from one or more conductive polymer layers. The conductive polymer(s) employed in such layers are typically 7-conjugated and have electrical conductivity after oxidation or reduction, such as an electrical conductivity of at least about 1 μS cm$^{-1}$ after oxidation. Examples of such π-conjugated conductive polymers include, for instance, polyheterocycles (e.g., polypyrroles, polythiophenes, polyanilines, etc.), polyacetylenes, poly-p-phenylenes, polyphenolates, and so forth. Particularly suitable conductive polymers are substituted polythiophenes having the following general structure:

wherein,

T is O or S;

D is an optionally substituted $C_1$ to $C_5$ alkylene radical (e.g., methylene, ethylene, n-propylene, n-butylene, n-pentylene, etc.);

$R_7$ is a linear or branched, optionally substituted $C_1$ to $C_{18}$ alkyl radical (e.g., methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl, n-octadecyl, etc.); optionally substituted $C_5$ to $C_{12}$ cycloalkyl radical (e.g., cyclopentyl, cyclohexyl, cycloheptyl, cyclooctyl, cyclononyl cyclodecyl, etc.); optionally substituted $C_6$ to $C_{14}$ aryl radical (e.g., phenyl, naphthyl, etc.); optionally substituted $C_7$ to $C_{18}$ aralkyl radical (e.g., benzyl, o-, m-, p-tolyl, 2,3-, 2,4-, 2,5-, 2-6, 3-4-, 3,5-xylyl, mesityl, etc.); optionally substituted $C_1$ to $C_4$ hydroxyalkyl radical, or hydroxyl radical; and q is an integer from 0 to 8, in some embodiments, from 0 to 2, and in one embodiment, 0; and n is from 2 to 5,000, in some embodiments from 4 to 2,000, and in some embodiments, from 5 to 1,000. Example of substituents for the radicals "D" or "$R_7$" include, for instance, alkyl, cycloalkyl, aryl, aralkyl, alkoxy, halogen, ether, thioether, disulphide, sulfoxide, sulfone, sulfonate, amino, aldehyde, keto, carboxylic acid ester, carboxylic acid, carbonate, carboxylate, cyano, alkylsilane and alkoxysilane groups, carboxylamide groups, and so forth.

Particularly suitable thiophene polymers are those in which "D" is an optionally substituted $C_2$ to $C_3$ alkylene radical. For instance, the polymer may be optionally substituted poly(3,4-ethylenedioxythiophene), which has the following general structure:

Methods for forming conductive polymers, such as described above, are well known in the art. For instance, U.S. Pat. No. 6,987,663 to Merker, et al., which is incorporated herein in its entirety by reference thereto for all purposes, describes various techniques for forming substituted polythiophenes from a monomeric precursor. The monomeric precursor may, for instance, have the following structure:

wherein,

T, D, $R_7$, and q are defined above. Particularly suitable thiophene monomers are those in which "D" is an optionally substituted $C_2$ to $C_3$ alkylene radical. For instance, optionally substituted 3,4-alkylenedioxythiophenes may be employed that have the general structure:

wherein, $R_7$ and q are as defined above. In one particular embodiment, "q" is 0. One commercially suitable example of 3,4-ethylenedioxythiophene is available from Heraeus Clevios under the designation Clevios™ M. Other suitable monomers are also described in U.S. Pat. Nos. 5,111,327 to Blohm, et al. and 6,635,729 to Groenendaal, et al., which are incorporated herein in their entirety by reference thereto for all purposes. Derivatives of these monomers may also be employed that are, for example, dimers or trimers of the above monomers. Higher molecular derivatives, i.e., tetramers, pentamers, etc. of the monomers are suitable for use in the present invention. The derivatives may be made up of identical or different monomer units and used in pure form and in a mixture with one another and/or with the monomers. Oxidized or reduced forms of these precursors may also be employed.

The thiophene monomers are chemically polymerized in the presence of an oxidative catalyst. The oxidative catalyst typically includes a transition metal cation, such as iron(III), copper(II), chromium(VI), cerium(IV), manganese(IV), manganese(VII), ruthenium(III) cations, etc. A dopant may also be employed to provide excess charge to the conductive polymer and stabilize the conductivity of the polymer. The dopant typically includes an inorganic or organic anion, such as an ion of a sulfonic acid. In certain embodiments, the oxidative catalyst employed in the precursor solution has both a catalytic and doping functionality in that it includes a cation (e.g., transition metal) and anion (e.g., sulfonic acid). For example, the oxidative catalyst may be a transition metal salt that includes iron(III) cations, such as iron(III) halides (e.g., $FeCl_3$) or iron(III) salts of other inorganic acids, such as $Fe(ClO_4)_3$ or $Fe_2(SO_4)_3$ and the iron(III) salts of organic acids and inorganic acids comprising organic radicals. Examples of iron (III) salts of inorganic acids with organic radicals include, for instance, iron(III) salts of sulfuric acid monoesters of $C_1$ to $C_{20}$ alkanols (e.g., iron(III) salt of lauryl sulfate). Likewise, examples of iron(III) salts of organic acids include, for instance, iron(III) salts of $C_1$ to $C_{20}$ alkane sulfonic acids (e.g., methane, ethane, propane, butane, or dodecane sulfonic acid); iron (III) salts of aliphatic perfluorosulfonic acids (e.g., trifluoromethane sulfonic acid, perfluorobutane sulfonic acid, or perfluorooctane sulfonic acid); iron (III) salts of aliphatic $C_1$ to $C_{20}$ carboxylic acids (e.g., 2-ethylhexylcarboxylic acid); iron (III) salts of aliphatic perfluorocarboxylic acids (e.g., trifluoroacetic acid or perfluorooctane acid); iron (III) salts of aromatic sulfonic acids optionally substituted by $C_1$ to $C_{20}$ alkyl groups (e.g., benzene sulfonic acid, o-toluene sulfonic acid, p-toluene sulfonic acid, or dodecylbenzene sulfonic acid); iron (III) salts of cycloalkane sulfonic acids (e.g., camphor sulfonic acid); and so forth. Mixtures of these above-mentioned iron(III) salts may also be used. Iron(III)-p-toluene sulfonate, iron(III)-o-toluene sulfonate, and mixtures thereof, are particularly suitable. One commercially suitable example of iron(III)-p-toluene sulfonate is available from Heraeus Clevios under the designation Clevios™ C.

Various methods may be utilized to form a conductive polymer layer. In one embodiment, the oxidative catalyst and monomer are applied, either sequentially or together, such that the polymerization reaction occurs in situ on the part. Suitable application techniques may include screen-printing, dipping, electrophoretic coating, and spraying, may be used to form a conductive polymer coating. As an example, the monomer may initially be mixed with the oxidative catalyst to form a precursor solution. Once the mixture is formed, it may be applied to the part and then allowed to polymerize so that the conductive coating is formed on the surface. Alternatively, the oxidative catalyst and monomer may be applied sequentially. In one embodiment, for example, the oxidative catalyst is dissolved in an organic solvent (e.g., butanol) and then applied as a dipping solution. The part may then be dried to remove the solvent therefrom. Thereafter, the part may be dipped into a solution containing the monomer.

Polymerization is typically performed at temperatures of from about −10° C. to about 250° C., and in some embodiments, from about 0° C. to about 200° C., depending on the oxidizing agent used and desired reaction time. Suitable polymerization techniques, such as described above, may be described in more detail in U.S. Pat. No. 7,515,396 to Biler. Still other methods for applying such conductive coating(s) may be described in U.S. Pat. Nos. 5,457,862 to Sakata, et al., 5,473,503 to Sakata, et al., 5,729,428 to Sakata, et al., and 5,812,367 to Kudoh, et al., which are incorporated herein in their entirety by reference thereto for all purposes.

In addition to in situ application, a conductive polymer layer may also be applied in the form of a dispersion of conductive polymer particles. Although their size may vary, it is typically desired that the particles possess a small diameter to increase the surface area available for adhering to the anode part. For example, the particles may have an average diameter of from about 1 to about 500 nanometers, in some embodiments from about 5 to about 400 nanometers, and in some embodiments, from about 10 to about 300 nanometers. The $D_{90}$ value of the particles (particles having a diameter of less than or equal to the $D_{90}$ value constitute 90% of the total volume of all of the solid particles) may be about 15 micrometers or less, in some embodiments about 10 micrometers or less, and in some embodiments, from about 1 nanometer to about 8 micrometers. The diameter of the particles may be determined using known techniques, such as by ultracentrifuge, laser diffraction, etc.

The formation of the conductive polymers into a particulate form may be enhanced by using a separate counterion to counteract the positive charge carried by the substituted polythiophene. In some cases, the polymer may possess positive and negative charges in the structural unit, with the positive charge being located on the main chain and the negative charge optionally on the substituents of the radical "R", such as sulfonate or carboxylate groups. The positive charges of the main chain may be partially or wholly saturated with the optionally present anionic groups on the radicals "R." Viewed overall, the polythiophenes may, in these cases, be cationic, neutral or even anionic. Nevertheless, they are all regarded as cationic polythiophenes as the polythiophene main chain has a positive charge.

The counterion may be a monomeric or polymeric anion. Polymeric anions can, for example, be anions of polymeric carboxylic acids (e.g., polyacrylic acids, polymethacrylic acid, polymaleic acids, etc.); polymeric sulfonic acids (e.g., polystyrene sulfonic acids ("PSS"), polyvinyl sulfonic acids, etc.); and so forth. The acids may also be copolymers, such as copolymers of vinyl carboxylic and vinyl sulfonic acids with other polymerizable monomers, such as acrylic acid esters and styrene. Likewise, suitable monomeric anions include, for example, anions of $C_1$ to $C_{20}$ alkane sulfonic acids (e.g., dodecane sulfonic acid); aliphatic perfluorosulfonic acids (e.g., trifluoromethane sulfonic acid, perfluorobutane sulfonic acid or perfluorooctane sulfonic acid); aliphatic $C_1$ to $C_{20}$ carboxylic acids (e.g., 2-ethyl-hexylcarboxylic add); aliphatic perfluorocarboxylic acids (e.g., trifluoroacetic acid or perfluorooctanoic acid); aromatic sulfonic acids optionally substituted by $C_1$ to $C_{20}$ alkyl groups (e.g., benzene sulfonic acid, o-toluene sulfonic acid, p-toluene sulfonic acid or dodecylbenzene sulfonic acid); cycloalkane sulfonic acids (e.g., camphor sulfonic acid or tetrafluoroborates, hexafluorophosphates, perchiorates, hexafluoroantimonates, hexafluoroarsenates or hexachloroantimonates); and so forth. Particularly suitable counteranions are polymeric anions, such as a polymeric carboxylic or sulfonic acid (e.g., polystyrene sulfonic acid ("PSS")). The molecular weight of such polymeric anions typically ranges from about 1,000 to about 2,000,000, and in some embodiments, from about 2,000 to about 500,000.

When employed, the weight ratio of such counterions to substituted polythiophenes in a given layer is typically from about 0.5:1 to about 50:1, in some embodiments from about 1:1 to about 30:1, and in some embodiments, from about 2:1 to about 20:1. The weight of the substituted polythiophene referred to in the above-referenced weight ratios refers to the weighed-in portion of the monomers used, assuming that a complete conversion occurs during polymerization.

The dispersion may also contain one or more binders to further enhance the adhesive nature of the polymeric layer and also increase the stability of the particles within the dispersion. The binders may be organic in nature, such as polyvinyl alcohols, polyvinyl pyrrolidones, polyvinyl chlorides, polyvinyl acetates, polyvinyl butyrates, polyacrylic acid esters, polyacrylic acid amides, polymethacrylic acid esters, polymethacrylic acid amides, polyacrylonitriles, styrene/acrylic acid ester, vinyl acetate/acrylic acid ester and ethylene/vinyl acetate copolymers, polybutadienes, polyisoprenes, polystyrenes, polyethers, polyesters, polycarbonates, polyurethanes, polyamides, polyimides, polysulfones, melamine formaldehyde resins, epoxide resins, silicone resins or celluloses. Crosslinking agents may also be employed to enhance the adhesion capacity of the binders. Such crosslinking agents may include, for instance, melamine compounds, masked isocyanates or functional silanes, such as 3-glycidoxypropyltrialkoxysilane, tetraethoxysilane and tetraethoxysilane hydrolysate or crosslinkable polymers, such as polyurethanes, polyacrylates or polyolefins, and subsequent crosslinking. Other components may also be included within the dispersion as is known in the art, such as dispersion agents (e.g., water), surface-active substances, etc.

If desired, one or more of the above-described application steps may be repeated until the desired thickness of the coating is achieved. In some embodiments, only a relatively thin layer of the coating is formed at a time. The total target thickness of the coating may generally vary depending on the desired properties of the capacitor. Typically, the resulting conductive polymer coating has a thickness of from about 0.2 micrometers ("μm") to about 50 μm, in some embodiments from about 0.5 μm to about 20 μm, and in some embodiments, from about 1 μm to about 5 μm. It should be understood that the thickness of the coating is not necessarily the same at all locations on the part. Nevertheless, the average thickness of the coating on the substrate generally falls within the ranges noted above.

The conductive polymer layer may optionally be healed. Healing may occur after each application of a conductive polymer layer or may occur after the application of the entire coating. In some embodiments, the conductive polymer can be healed by dipping the part into an electrolyte solution, and thereafter applying a constant voltage to the solution until the current is reduced to a preselected level. If desired, such healing can be accomplished in multiple steps. For example, an electrolyte solution can be a dilute solution of the monomer, the catalyst, and dopant in an alcohol solvent (e.g., ethanol). The coating may also be washed if desired to remove various byproducts, excess reagents, and so forth.

If desired, the capacitor may also contain other layers as is known in the art. For example, a protective coating may optionally be formed between the dielectric and solid electrolyte, such as one made of a relatively insulative resinous material (natural or synthetic). Such materials may have a specific resistivity of greater than about 10 Ω/cm, in some embodiments greater than about 100, in some embodiments greater than about 1,000 Ω/cm, in some embodiments greater than about $1 \times 10^5$ Ω/cm, and in some embodiments, greater than about $1 \times 10^{10}$ Ω/cm. Some resinous materials that may be utilized in the present invention include, but are not limited to, polyurethane, polystyrene, esters of unsaturated or saturated fatty acids (e.g., glycerides), and so forth. For instance, suitable esters of fatty acids include, but are not limited to, esters of lauric acid, myristic acid, palmitic acid, stearic acid, eleostearic acid, oleic acid, linoleic acid, linolenic acid, aleuritic acid, shellolic acid, and so forth. These esters of fatty acids have been found particularly useful when used in relatively complex combinations to form a "drying oil", which allows the resulting film to rapidly polymerize into a stable layer. Such drying oils may include mono-, di-, and/or triglycerides, which have a glycerol backbone with one, two, and three, respectively, fatty acyl residues that are esterified. For instance, some suitable drying oils that may be used include, but are not limited to, olive oil, linseed oil, castor oil, tung oil, soybean oil, and shellac. These and other protective coating materials are described in more detail U.S. Pat. No. 6,674,635 to Fife, et al., which is incorporated herein in its entirety by reference thereto for all purposes.

The part may also be applied with a carbon layer (e.g., graphite) and silver layer, respectively. The silver coating may, for instance, act as a solderable conductor, contact layer, and/or charge collector for the capacitor and the carbon coating may limit contact of the silver coating with the solid electrolyte. Such coatings may cover some or all of the solid electrolyte.

Generally speaking, the capacitor element is substantially free of resins that encapsulate the capacitor element as are often employed in conventional solid electrolytic capacitors. Among other things, the encapsulation of the capacitor element can lead to instability in extreme environments, i.e., high temperature (e.g., above about 175° C.) and/or high voltage (e.g., above about 35 volts).

II. Housing

As indicated above, the capacitor element is hermetically sealed within a housing. Any of a variety of different materials may be used to form the housing, such as metals, plastics, ceramics, and so forth. In one embodiment, for example, the housing includes one or more layers of a metal, such as tantalum, niobium, aluminum, nickel, hafnium, titanium, copper, silver, steel (e.g., stainless), alloys thereof (e.g., electrically conductive oxides), composites thereof (e.g., metal coated with electrically conductive oxide), and so forth. In another embodiment, the housing may include one or more layers of a ceramic material, such as aluminum nitride, aluminum oxide, silicon oxide, magnesium oxide, calcium oxide, glass, etc., as well as combinations thereof.

Figure 1:
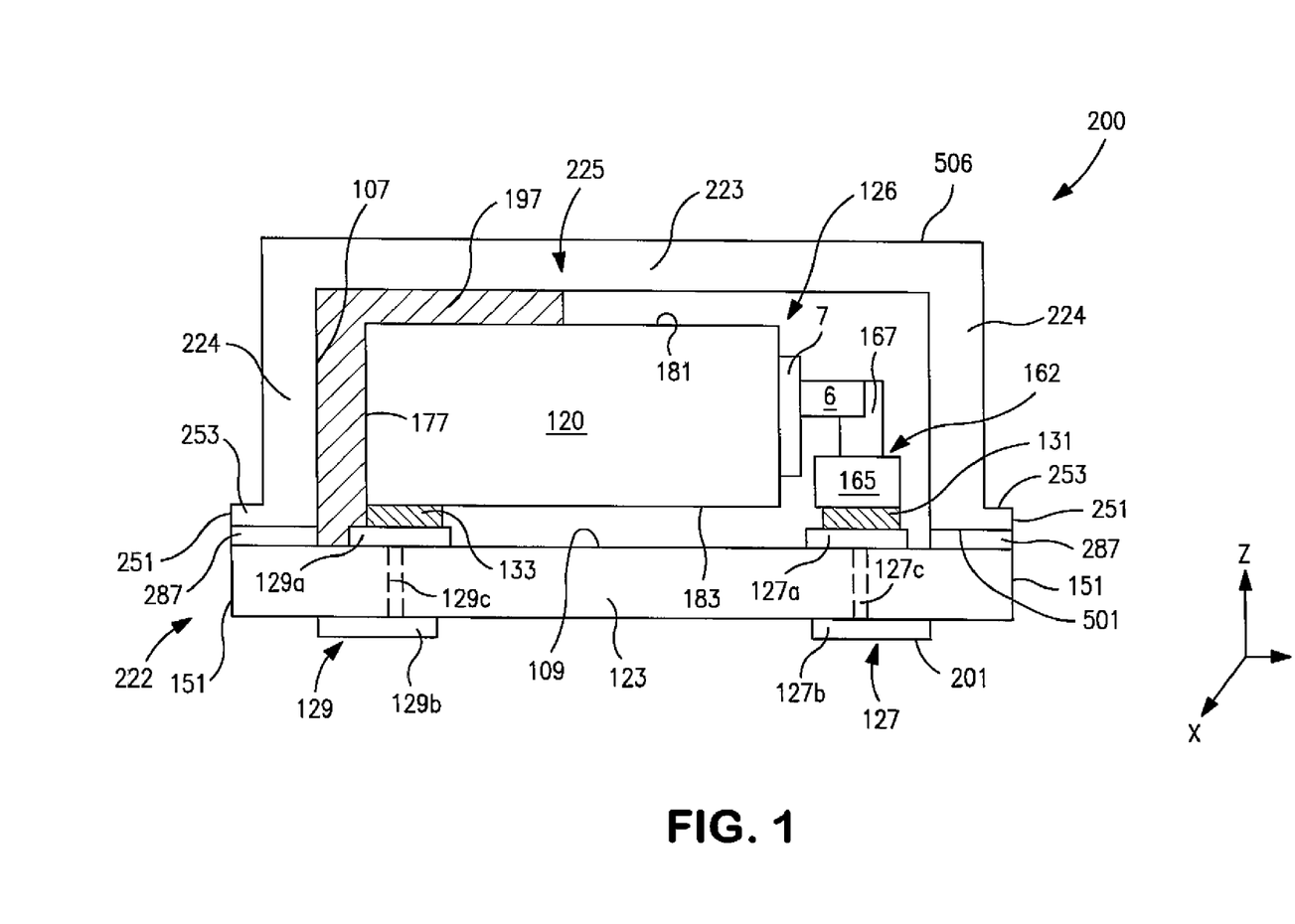
FIG. 1 is a cross-sectional view of one embodiment of a capacitor assembly of the assembly of the present invention.

The housing may have any desired shape, such as cylindrical, D-shaped, rectangular, triangular, prismatic, etc. Referring to FIG. 1, for example, one embodiment of a capacitor assembly 200 is shown that contains a housing 222 and a capacitor element 120. In this particular embodiment, the housing 222 is generally rectangular. Typically, the housing and the capacitor element have the same or similar shape so that the capacitor element can be readily accommodated within the interior cavity. In the illustrated embodiment, for example, both the capacitor element 120 and the housing 222 have a generally rectangular shape.

If desired, the capacitor assembly of the present invention may exhibit a relatively high volumetric efficiency. To facilitate such high efficiency, the capacitor element typically occupies a substantial portion of the volume of an interior cavity of the housing. For example, the capacitor element may occupy about 30 vol. % or more, in some embodiments about 50 vol. % or more, in some embodiments about 60 vol. % or more, in some embodiments about 70 vol. % or more, in some embodiments from about 80 vol. % to about 98 vol. %, and in some embodiments, from about 85 vol. % to 97 vol. % of the interior cavity of the housing. To this end, the difference between the dimensions of the capacitor element and those of the interior cavity defined by the housing are typically relatively small.

Referring to FIG. 1, for example, the capacitor element 120 may have a length (excluding the length of the anode lead 6) that is relatively similar to the length of an interior cavity 126 defined by the housing 222. For example, the ratio of the length of the anode to the length of the interior cavity ranges from about 0.40 to 1.00, in some embodiments from about 0.50 to about 0.99, in some embodiments from about 0.60 to about 0.99, and in some embodiments, from about 0.70 to about 0.98. The capacitor element 120 may have a length of from about 5 to about 10 millimeters, and the interior cavity 126 may have a length of from about 6 to about 15 millimeters. Similarly, the ratio of the height of the capacitor element 120 (in the −z direction) to the height of the interior cavity 126 may range from about 0.40 to 1.00, in some embodiments from about 0.50 to about 0.99, in some embodiments from about 0.60 to about 0.99, and in some embodiments, from about 0.70 to about 0.98. The ratio of the width of the capacitor element 120 (in the −x direction) to the width of the interior cavity 126 may also range from about 0.50 to 1.00, in some embodiments from about 0.60 to about 0.99, in some embodiments from about 0.70 to about 0.99, in some embodiments from about 0.80 to about 0.98, and in some embodiments, from about 0.85 to about 0.95. For example, the width of the capacitor element 120 may be from about 2 to about 7 millimeters and the width of the interior cavity 126 may be from about 3 to about 10 millimeters, and the height of the capacitor element 120 may be from about 0.5 to about 2 millimeters and the width of the interior cavity 126 may be from about 0.7 to about 6 millimeters.

Although by no means required, the capacitor element may be attached to the housing in such a manner that an anode termination and cathode termination are formed external to the housing for subsequent integration into a circuit. The particular configuration of the terminations may depend on the intended application. In one embodiment, for example, the capacitor assembly may be formed so that it is surface mountable, and yet still mechanically robust. For example, the anode lead may be electrically connected to external, surface mountable anode and cathode terminations (e.g., pads, sheets, plates, frames, etc.). Such terminations may extend through the housing to connect with the capacitor. The thickness or height of the terminations is generally selected to minimize the thickness of the capacitor assembly. For instance, the thickness of the terminations may range from about 0.05 to about 1 millimeter, in some embodiments from about 0.05 to about 0.5 millimeters, and from about 0.1 to about 0.2 millimeters. If desired, the surface of the terminations may be electroplated with nickel, silver, gold, tin, etc. as is known in the art to ensure that the final part is mountable to the circuit board. In one particular embodiment, the termination(s) are deposited with nickel and silver flashes, respectively, and the mounting surface is also plated with a tin solder layer. In another embodiment, the termination(s) are deposited with thin outer metal layers (e.g., gold) onto a base metal layer (e.g., copper alloy) to further increase conductivity.

In certain embodiments, connective members may be employed within the interior cavity of the housing to facilitate connection to the terminations in a mechanically stable manner. For example, referring again to FIG. 1, the capacitor assembly 200 may include a connection member 162 that is formed from a first portion 167 and a second portion 165. The connection member 162 may be formed from conductive materials similar to the external terminations. The first portion 167 and second portion 165 may be integral or separate pieces that are connected together, either directly or via an additional conductive element (e.g., metal). In the illustrated embodiment, the second portion 165 is provided in a plane that is generally parallel to a lateral direction in which the lead 6 extends (e.g., −y direction). The first portion 167 is "upstanding" in the sense that it is provided in a plane that is generally perpendicular the lateral direction in which the lead 6 extends. In this manner, the first portion 167 can limit movement of the lead 6 in the horizontal direction to enhance surface contact and mechanical stability during use. If desired, an insulative material 7 (e.g. Teflon™ washer) may be employed around the lead 6.

The first portion 167 may possess a mounting region (not shown) that is connected to the anode lead 6. The region may have a "U-shape" for further enhancing surface contact and mechanical stability of the lead 6. Connection of the region to the lead 6 may be accomplished using any of a variety of known techniques, such as welding, laser welding, conductive adhesives, etc. In one particular embodiment, for example, the region is laser welded to the anode lead 6. Regardless of the technique chosen, however, the first portion 167 can hold the anode lead 6 in substantial horizontal alignment to further enhance the dimensional stability of the capacitor assembly 200.

Referring again to FIG. 1, one embodiment of the present invention is shown in which the connective member 162 and capacitor element 120 are connected to the housing 222 through anode and cathode terminations 127 and 129, respectively. The anode termination 127 contains a first region 127a that is positioned within the housing 222 and electrically connected to the connection member 162 and a second region 127b that is positioned external to the housing 222 and provides a mounting surface 201. Likewise, the cathode termination 129 contains a first region 129a that is positioned within the housing 222 and electrically connected to the solid electrolyte of the capacitor element 120 and a second region 129b that is positioned external to the housing 222 and provides a mounting surface 203. It should be understood that the entire portion of such regions need not be positioned within or external to the housing.

In the illustrated embodiment, a conductive trace 127c extends in a base 123 of the housing to connect the first region 127a and second region 127b. Similarly, a conductive trace 129c extends in the base 123 of the housing to connect the first region 127a and second region 127b. The conductive traces and/or regions of the terminations may be separate or integral. In addition to extending through the outer wall of the housing, the traces may also be positioned at other locations, such as external to the outer wall. Of course, the present invention is by no means limited to the use of conductive traces for forming the desired terminations.

Regardless of the particular configuration employed, connection of the terminations 127 and 129 to the capacitor element 120 may be made using any known technique, such as welding, laser welding, conductive adhesives, etc. In one particular embodiment, for example, a conductive adhesive 131 is used to connect the second portion 165 of the connection member 162 to the anode termination 127. Likewise, a conductive adhesive 133 is used to connect the cathode of the capacitor element 120 to the cathode termination 129. The conductive adhesives may be formed from conductive metal particles contained with a resin composition. The metal particles may be silver, copper, gold, platinum, nickel, zinc, bismuth, etc. The resin composition may include a thermoset resin (e.g., epoxy resin), curing agent (e.g., acid anhydride), and coupling agent (e.g., silane coupling agents). Suitable conductive adhesives are described in U.S. Patent Application Publication No. 2006/0038304 to Osaka, et al., which is incorporated herein in its entirety by reference thereto for all purposes.

Optionally, a polymeric restraint may also be disposed in contact with one or more surfaces of the capacitor element, such as the rear surface, front surface, upper surface, lower surface, side surface(s), or any combination thereof. The polymeric restraint can reduce the likelihood of delamination by the capacitor element from the housing. In this regard, the polymeric restraint may possesses a certain degree of strength that allows it to retain the capacitor element in a relatively fixed positioned even when it is subjected to vibrational forces, yet is not so strong that it cracks. For example, the restraint may possess a tensile strength of from about 1 to about 150 Megapascals ("MPa"), in some embodiments from about 2 to about 100 MPa, in some embodiments from about 10 to about 80 MPa, and in some embodiments, from about 20 to about 70 MPa, measured at a temperature of about 25° C. It is normally desired that the restraint is not electrically conductive.

Although any of a variety of materials may be employed that have the desired strength properties noted above, curable thermosetting resins have been found to be particularly suitable for use in the present invention. Examples of such resins include, for instance, epoxy resins, polyimides, melamine resins, urea-formaldehyde resins, polyurethanes, silicone polymers, phenolic resins, etc. In certain embodiments, for example, the restraint may employ one or more polyorganosiloxanes. Silicon-bonded organic groups used in these polymers may contain monovalent hydrocarbon and/or monovalent halogenated hydrocarbon groups. Such monovalent groups typically have from 1 to about 20 carbon atoms, preferably from 1 to 10 carbon atoms, and are exemplified by, but not limited to, alkyl (e.g., methyl, ethyl, propyl, pentyl, octyl, undecyl, and octadecyl); cycloalkyl (e.g., cyclohexyl); alkenyl (e.g., vinyl, allyl, butenyl, and hexenyl); aryl (e.g., phenyl, tolyl, xylyl, benzyl, and 2-phenylethyl); and halogenated hydrocarbon groups (e.g., 3,3,3-trifluoropropyl, 3-chloropropyl, and dichlorophenyl). Typically, at least 50%, and more preferably at least 80%, of the organic groups are methyl. Examples of such methylpolysiloxanes may include, for instance, polydimethylsiloxane ("PDMS"), polymethylhydrogensiloxane, etc. Still other suitable methyl polysiloxanes may include dimethyldiphenylpolysiloxane, dimethyl/methylphenylpolysiloxane, polymethylphenylsiloxane, methylphenyl/dimethylsiloxane, vinyldimethyl terminated polydimethylsiloxane, vinylmethyl/dimethylpolysiloxane, vinyldimethyl terminated vinylmethyl/dimethylpolysiloxane, divinylmethyl terminated polydimethylsiloxane, vinylphenylmethyl terminated polydimethylsiloxane, dimethylhydro terminated polydimethylsiloxane, methylhydro/dimethylpolysiloxane, methylhydro terminated methyloctylpolysiloxane, methylhydro/phenylmethyl polysiloxane, etc.

The organopolysiloxane may also contain one more pendant and/or terminal polar functional groups, such as hydroxyl, epoxy, carboxyl, amino, alkoxy, methacrylic, or mercapto groups, which impart some degree of hydrophilicity to the polymer. For example, the organopolysiloxane may contain at least one hydroxy group, and optionally an average of at least two silicon-bonded hydroxy groups (silanol groups) per molecule. Examples of such organopolysiloxanes include, for instance, dihydroxypolydimethylsiloxane, hydroxy-trimethylsiloxypolydimethylsiloxane, etc. Other examples of hydroxyl-modified organopolysiloxanes are described in U.S. Patent Application Publication No. 2003/0105207 to Kleyer, et al., which is incorporated herein in its entirety by reference thereto for all purposes. Alkoxy-modified organopolysiloxanes may also be employed, such as dimethoxypolydimethylsiloxane, methoxy-trimethylsiloxypolydimethylsiloxane, diethoxypolydimethylsiloxane, ethoxy-trimethylsiloxy-polydimethylsiloxane, etc. Still other suitable organopolysiloxanes are those modified with at least one amino functional group. Examples of such amino-functional polysiloxanes include, for instance, diamino-functional polydimethylsiloxanes. Various other suitable polar functional groups for organopolysiloxanes are also described in U.S. Patent Application Publication No. 2010/00234517 to Plantenberg, et al., which is incorporated herein in its entirety by reference thereto for all purposes.

Epoxy resins are also particularly suitable for use as the polymeric restraint. Examples of suitable epoxy resins include, for instance, glycidyl ether type epoxy resins, such as bisphenol A type epoxy resins, bisphenol F type epoxy resins, phenol novolac type epoxy resins, orthocresol novolac type epoxy resins, brominated epoxy resins and biphenyl type epoxy resins, cyclic aliphatic epoxy resins, glycidyl ester type epoxy resins, glycidylamine type epoxy resins, cresol novolac type epoxy resins, naphthalene type epoxy resins, phenol aralkyl type epoxy resins, cyclopentadiene type epoxy resins, heterocyclic epoxy resins, etc. Still other suitable conductive adhesive resins may also be described in U.S. Patent Application Publication No. 2006/0038304 to Osako, et al. and U.S. Pat. No. 7,554,793 to Chacko, which are incorporated herein in their entirety by reference thereto for all purposes.

If desired, curing agents may also be employed in the polymeric restraint to help promote curing. The curing agents typically constitute from about 0.1 to about 20 wt. % of the restraint. Exemplary curing agents include, for instance, amines, peroxides, anhydrides, phenol compounds, silanes, acid anhydride compounds and combinations thereof. Specific examples of suitable curing agents are dicyandiamide, 1-(2 cyanoethyl) 2-ethyl-4-methylimidazole, 1-benzyl 2-methylimidazole, ethyl cyano propyl imidazole, 2-methylimidazole, 2-phenylimidazole, 2-ethyl-4-methylimidazole, 2-undecylimidazole, 1-cyanoethyl-2-methylimidazole, 2,4-dicyano-6,2-methylimidazolyl-(1)-ethyl-s-triazine, and 2,4-dicyano-6,2-undecylimidazolyl-(1)-ethyl-s-triazine, imidazolium salts (such as 1-cyanoethyl-2-undecylimidazolium trimellitate, 2-methylimidazolium isocyanurate, 2-ethyl-4-methylimidazolium tetraphenylborate, and 2-ethyl-1,4-dimethylimidazolium tetraphenylborate, etc. Still other useful curing agents include phosphine compounds, such as tributylphosphine, triphenylphosphine, tris(dimethoxyphenyl)phosphine, tris(hydroxypropyl)phosphine, and tris(cyanoethyl)phsphine; phosphonium salts, such as tetraphenylphosphonium-tetraphenylborate, methyltributylphosphonium-tetraphenylborate, and methyltricyanoethylphosphonium tetraphenylborate); amines, such as 2,4,6-tris(dimethylaminomethyl)phenol, benzylmethylamine, tetramethylbutylguanidine, N-methylpiperazine, and 2-dimethylamino-1-pyrroline, ammonium salts, such as triethylammonium tetraphenylborate; diazabicyclo compounds, such as 1,5-diazabicyclo[5,4,0]-7-undecene, 1,5-diazabicyclo[4,3,0]-5-nonene, and 1,4-diazabicyclo[2,2,2]-octane; salts of diazabicyclo compounds such as tetraphenylborate, phenol salt, phenolnovolac salt, and 2-ethylhexanoic acid salt; and so forth.

Still other additives may also be employed, such as photoinitiators, viscosity modifiers, suspension aiding agents, pigments, stress reducing agents, coupling agents (e.g., silane coupling agents), nonconductive fillers (e.g., clay, silica, alumina, etc.), stabilizers, etc. Suitable photoinitiators may include, for instance, benzoin, benzoin methyl ether, benzoin ethyl ether, benzoin n-propyl ether, benzoin isobutyl ether, 2,2 dihydroxy-2-phenylacetophenone, 2,2-dimethoxy-2-phenylacetophenone 2,2-diethoxy-2-phenylacetophenone, 2,2-diethoxyacetophenone, benzophenone, 4,4-bisdialylaminobenzophenone, 4-dimethylaminobenzoic acid, alkyl 4-dimethylaminobenzoate, 2-ethylanthraquinone, xanthone, thioxanthone, 2-cholorothioxanthone, etc. When employed, such additives typically constitute from about 0.1 to about 20 wt. % of the total composition.

Referring again to FIG. 1, for instance, one embodiment is shown in which a single polymeric restraint 197 is disposed in contact with an upper surface 181 and rear surface 177 of the capacitor element 120. While a single restraint is shown in FIG. 1, it should be understood that separate restraints may be employed to accomplish the same function. In fact, more generally, any number of polymeric restraints may be employed to contact any desired surface of the capacitor element. When multiple restraints are employed, they may be in contact with each other or remain physically separated. For example, in one embodiment, a second polymeric restraint (not shown) may be employed that contacts the upper surface 181 and front surface 179 of the capacitor element 120. The first polymeric restraint 197 and the second polymeric restraint (not shown) may or may not be in contact with each other. In yet another embodiment, a polymeric restraint may also contact a lower surface 183 and/or side surface(s) of the capacitor element 120, either in conjunction with or in lieu of other surfaces.

Regardless of how it is applied, it is typically desired that the polymeric restraint is also in contact with at least one surface of the housing to help further mechanically stabilize the capacitor element against possible delamination. For example, the restraint may be in contact with an interior surface of one or more sidewall(s), outer wall, lid, etc. In FIG. 1, for example, the polymeric restraint 197 is in contact with interior surfaces 107 and 109 of the housing 222. While in contact with the housing, it is nevertheless desired that at least a portion of the cavity defined by the housing remains unoccupied to allow for the inert gas to flow through the cavity and limit contact of the solid electrolyte with oxygen. For example, at least about 5% of the cavity volume typically remains unoccupied by the capacitor element and polymer restraint, and in some embodiments, from about 10% to about 50% of the cavity volume.

Once connected in the desired manner, the resulting package is hermetically sealed. Referring again to FIG. 1, for instance, the housing 222 includes a base 123 and a lid 225 between which the cavity 126 is formed. The lid 225 and base 123 may be formed from a ceramic, metal (e.g., iron, copper, nickel, cobalt, etc., as well as alloys thereof), plastic, and so forth. In one embodiment, for example, the base 123 is formed from a ceramic material and the lid 225 is formed from a metal material. The lid 225 includes an outer wall 223 that is integral with at least one sidewall 224. In the illustrated embodiment, for example, two opposing sidewalls 224 are shown in cross-section. The height of the sidewall(s) 224 is generally such that the lid 225 does not contact any surface of the capacitor element 120 so that it is not contaminated. The outer wall 223 and base 123 both extend in a lateral direction (−y direction) and are generally parallel with each other and to the lateral direction of the anode lead 6. The sidewall 224 extends from the outer wall 223 in a longitudinal direction that is generally perpendicular to the base 123. A distal end 500 of the lid 225 is defined by the outer wall 223 and a proximal end 501 is defined by a lip 253 of the sidewall 224.

Figure 2:
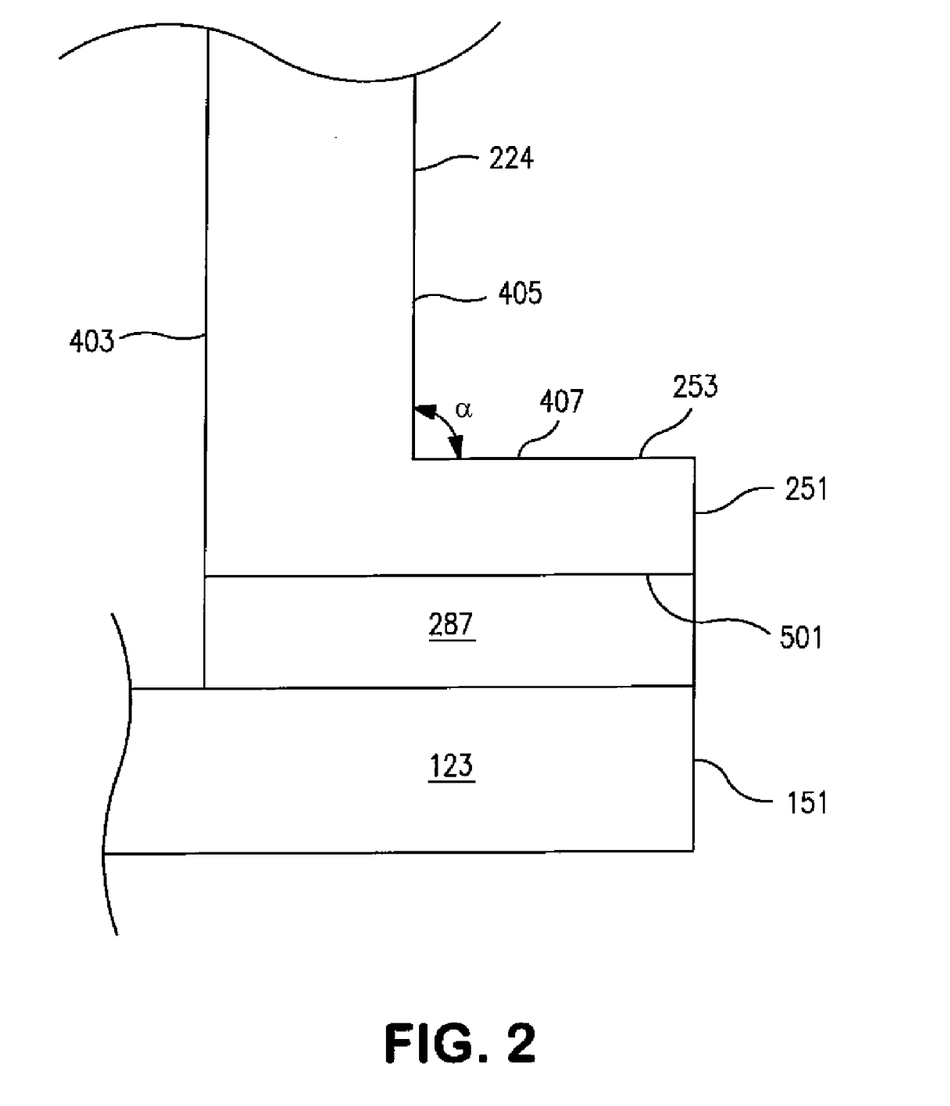
FIG. 2 is an exploded cross-sectional view of the lid sidewall of FIG. 1.

FIG. 2 shows the lip 253 in more detail. More particularly, the sidewall 224 has a thickness in a lateral direction defined between surfaces 403 and 405. The lip 253 extends from the sidewall 224 in the lateral direction, which may be generally parallel to the lateral direction of the base 123. The angle α between the sidewall 224 and the lip 253 may vary, but is typically from about 60° to about 120°, in some embodiments from about 70° to about 110°, and in some embodiments, from about 80° to about 100° (e.g., about 90°). The lip 253 also defines a peripheral edge 251, which may be generally perpendicular to the lateral direction in which the lip 253 and base 123 extend. The peripheral edge 251 is located beyond the outer periphery of the sidewall 224 and may be generally coplanar with an edge 151 of the base 123. The lip 253 may be sealed to the base 123 using any known technique, such as welding (e.g., resistance or laser), soldering, glue, etc. For example, in the illustrated embodiment, a sealing member 287 is employed (e.g., glass-to-metal seal, Kovar® ring, etc.) between the components to facilitate their attachment. Regardless, the use of a lip described above can enable a more stable connection between the components and improve the seal and mechanical stability of the capacitor assembly.

Hermetic sealing typically occurs in the presence of a gaseous atmosphere that contains at least one inert gas so as to inhibit oxidation of the solid electrolyte during use. The inert gas may include, for instance, nitrogen, helium, argon, xenon, neon, krypton, radon, and so forth, as well as mixtures thereof. Typically, inert gases constitute the majority of the atmosphere within the housing, such as from about 50 wt. % to 100 wt. %, in some embodiments from about 75 wt. % to 100 wt. %, and in some embodiments, from about 90 wt. % to about 99 wt. % of the atmosphere. If desired, a relatively small amount of non-inert gases may also be employed, such as carbon dioxide, oxygen, water vapor, etc. In such cases, however, the non-inert gases typically constitute 15 wt. % or less, in some embodiments 10 wt. % or less, in some embodiments about 5 wt. % or less, in some embodiments about 1 wt. % or less, and in some embodiments, from about 0.01 wt. % to about 1 wt. % of the atmosphere within the housing. For example, the moisture content (expressed in terms of relatively humidity) may be about 10% or less, in some embodiments about 5% or less, in some embodiments about 1% or less, and in some embodiments, from about 0.01 to about 5%.

Figure 3:
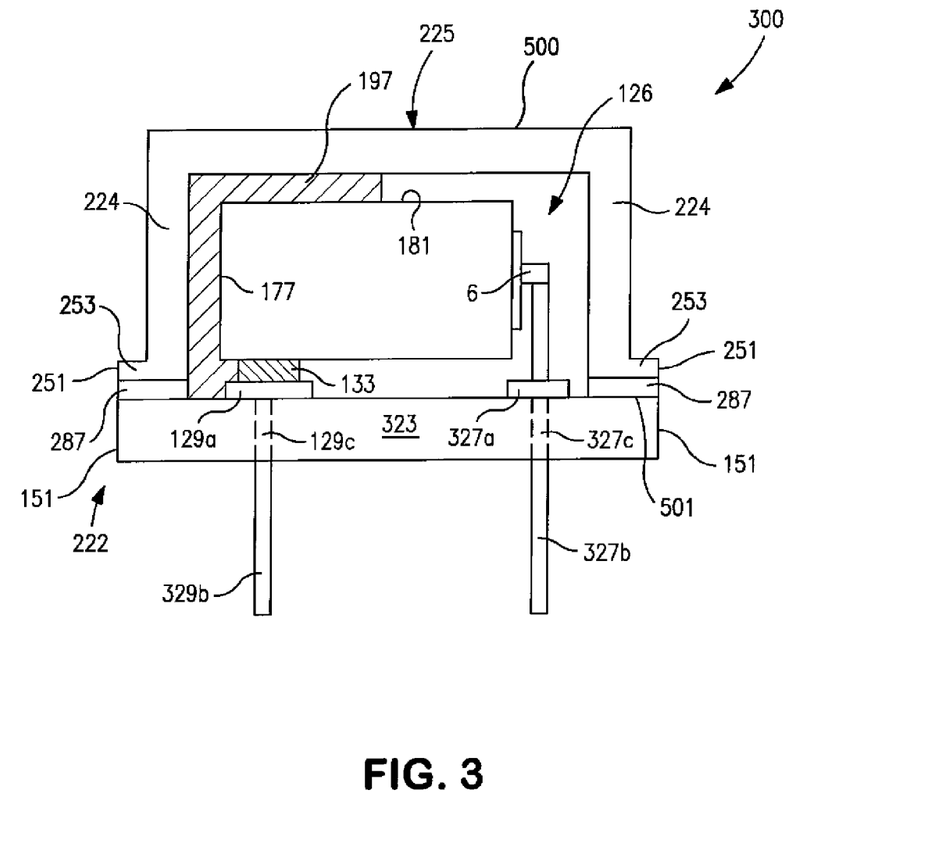
FIG. 3 is a cross-sectional view of yet another embodiment of a capacitor assembly of the assembly of the present invention.

It should be understood that the embodiments described are only exemplary, and that various other configurations may be employed in the present invention. For example, FIG. 3 shows a capacitor assembly 300 having a housing configuration similar to that of FIGS. 1-2, except that terminal pins 327b and 329b are employed as the external terminations for the anode and cathode, respectively. More particularly, the terminal pin 327a extends through a trace 327c formed in the outer wall 323 and is connected to the anode lead 6 using known techniques (e.g., welding). An additional section 327a may be employed to secure the pin 327b. Likewise, the terminal pin 329b extends through a trace 329c formed in the outer wall 323 and is connected to the cathode via a conductive adhesive 133 as described above.

The embodiments shown in FIGS. 1-3 are discussed herein in terms of only a single capacitor element. It should also be understood, however, that multiple capacitor elements may also be hermetically sealed within a housing. The multiple capacitor elements may be attached to the housing any of a variety of different techniques.

As a result of the present invention, the capacitor assembly may exhibit excellent electrical properties even when exposed to high temperature and high voltage environments. For example, the capacitor assembly may exhibit a relatively high "breakdown voltage" (voltage at which the capacitor fails), such as about 35 volts or more, in some embodiments about 50 volts or more, in some embodiments about 60 volts or more, and in some embodiments, from about 60 volts to about 100 volts, such as determined by increasing the applied voltage in increments of 3 volts until the leakage current reaches 1 mA. Likewise, the capacitor may also be able to withstand relatively high surge currents, which is also common in high voltage applications. The peak surge current may, for example, about 2 times the rated voltage or more, such as range from about 40 Amps or more, in some embodiments about 60 Amps or more, and in some embodiments, and in some embodiments, from about 120 Amps to about 250 Amps.

The capacitance may likewise be about 1 milliFarad per square centimeter ("$mF/cm^2$") or more, in some embodiments about 2 $mF/cm^2$ or more, in some embodiments from about 5 to about 50 $mF/cm^2$, and in some embodiments, from about 8 to about 20 $mF/cm^2$. The capacitance may be determined at an operating frequency of 120 Hz and a temperature of 25° C. In addition, the capacitor assembly can also exhibit a relatively high percentage of its wet capacitance, which enables it to have only a small capacitance loss and/or fluctuation in the presence of atmosphere humidity. This performance characteristic is quantified by the "dry to wet capacitance percentage", which is determined by the equation:

$$\text{Dry to Wet Capacitance} = (1 - ([\text{Wet} - \text{Dry}]/\text{Wet})) \times 100$$

The capacitor assembly of the present invention, for instance, may exhibit a dry to wet capacitance percentage of about 80% or more, in some embodiments about 85% or more, in some embodiments about 90% or more, and in some embodiments, from about 92% to 100%.

The capacitor assembly may also have an equivalence series resistance ("ESR") of less than about 50 ohms, in some embodiments less than about 25 ohms, in some embodiments from about 0.01 to about 10 ohms, and in some embodiments, from about 0.05 to about 5 ohms, measured at an operating frequency of 100 kHz. In addition, the leakage current, which generally refers to the current flowing from one conductor to an adjacent conductor through an insulator, can be maintained at relatively low levels. For example, the numerical value of the normalized leakage current of a capacitor of the present invention is, in some embodiments, less than about 1 $\mu A/\mu F*V$, in some embodiments less than about 0.5 $\mu A/\mu F*V$, and in some embodiments, less than about 0.1 $\mu A/\mu F*V$, where $\mu A$ is microamps and $uF*V$ is the product of the capacitance and the rated voltage.

The electrical properties, such as described above, may even be maintained after aging for a substantial amount of time at high temperatures. For example, the values may be maintained for about 100 hours or more, in some embodiments from about 300 hours to about 3000 hours, and in some embodiments, from about 400 hours to about 2500 hours (e.g., 500 hours, 600 hours, 700 hours, 800 hours, 900 hours, 1000 hours, 1100 hours, 1200 hours, or 2000 hours) at temperatures ranging from about 100° C. to about 250° C., and, in some embodiments from about 100° C. to about 225° C., and in some embodiments, from about 100° C. to about 225° C. (e.g., 100° C., 125° C., 150° C., 175° C., or 200° C.).

The present invention may be better understood by reference to the following examples.

Test Procedures

Equivalent Series Resistance (ESR)

Equivalence series resistance may be measured using a Keithley 3330 Precision LCZ meter with Kelvin Leads 2.2 volt DC bias and a 0.5 volt peak to peak sinusoidal signal. The operating frequency was 100 kHz and the temperature was 23° C.±2° C.

Capacitance

The capacitance was measured using a Keithley 3330 Precision LCZ meter with Kelvin Leads with 2.2 volt DC bias and a 0.5 volt peak to peak sinusoidal signal. The operating frequency was 120 Hz and the temperature was 23° C.±2° C.

Fine Leaks Testing:

Assembled parts in appropriate hermetically sealed housing were put into a helium chamber (4.3 kg/cm). After 1 hour, the assembled parts were measured with a helium mass detector (Pfeiffer Vacuum—HLT560) with a rejection limit of $10^{-8}$ cc·atm·s$^{-1}$.

Example 1

A tantalum anode (5.20 mm×3.70 mm×0.85 mm) was anodized at 125V in a liquid electrolyte to 10 $\mu F$. A conductive polymer coating was then formed by dipping the entire anode into a poly(3,4-ethylenedioxythiophene) ("PEDT") dispersion (Clevios™ K, solids content of 1.1%). The part was then dried at 125° C. for 20 minutes. This process was repeated 10 times. Thereafter, the part was dipped at a speed of 0.1 mm/s into a PEDT dispersion (solids content of 2.8%) so that the dispersion reached the shoulder of the part. The part was left in the dispersion for 10 seconds, dried at 125° C. for 30 minutes, and then cooled down to room temperature. This process was repeated 5 times. The part was then coated with graphite and silver. A copper-based leadframe material was used to finish the assembly process. A single cathode connective member was attached to the lower surface of the capacitor element using a silver adhesive. The tantalum wire of the capacitor element was then laser welded to an anode connective member.

The anode and cathode connective members of the leadframe were then glued to a gold cathode termination and welded to a gold anode termination located inside a ceramic housing having a length of 11.00 mm, a width of 6.00 mm, and a thickness of 2.20 mm. The housing had gold plated solder pads on the bottom inside part of ceramic housing. The adhesive employed for the cathode connection was a tin solder paste (EPO-Tek E3035) and the adhesive was applied only between the leadframe portions and gold plated solder pad. The welding employed for the anode connection was a resistance welding and the energy of 190 W was applied between the leadframe portions and ceramic housing gold plated solder pad during 90 ms. The assembly was then loaded in a convection reflow oven to solder the paste. After that, a Kovar® lid having a length of 9.95 mm, a width of 4.95 mm, and a thickness of 0.10 mm was placed over the top of the container, closely on the seal ring of the ceramic housing (Kovar® ring having a thickness of 0.30 mm) so that there was no direct contact between the interior surface of the lid and the exterior surface of the attached capacitor. The resulting assembly was placed into a welding chamber and purged with nitrogen gas for 120 minutes before seam welding between the seal ring and the lid was performed. No additional burn-in or healing was performed after the seam welding. Multiple parts (50) were made in this manner.

Example 2

A capacitor element was initially formed and connected to anode and cathode connective members as described in Example 1. The anode and cathode connective members were then resistance welded to stainless steel portions of a termination located on a lower wall as shown in FIG. 3. The welding occurred at an energy of 190 W for 90 ms. A metal lid containing lips as shown in FIG. 3 was then placed over the wall to form a housing having a length of 20.10 mm, a width of 12.50 mm, and a thickness of 4.60 mm. Stainless steel pads (isolated through the glass bushing from the part of metal housing) were located between the contact areas of the lid and the bottom wall. The resulting assembly was placed into a welding chamber and purged with nitrogen gas for 120 minutes before seam welding. No additional burn-in or healing was performed after the seam welding. Multiple parts (50) were made in this manner.

The finished capacitors of Examples 1 and 2 were tested for fine leaks as described above. It was determined that more than 95% of the parts of Example 2 were determined to pass the mass detection limit, as compared to only 81% of the parts of Example 1. It is believed that the high yield was due to using of the lip design for the lid, which enabled a more stable connection between the components of housing and better performance for seam welding process. The finished capacitors of Examples 1-2 were also tested for electrical performance (i.e., leakage current, ESR, and capacitance) by attaching the parts via solder paste to a PCB board. The measurements were conducted at 25° C. and then repeated after 2000 hours of storage at a temperature of 125° C. and an applied rated voltage of 35V. The results are set forth below.

| | Electrical Performance at 25° C. | | | Electrical Performance after 2000 hours, 125° C./35 V | | |
|---|---|---|---|---|---|---|
| Sample | DCL [µA] | ESR [mOhm] | Cap [µF] | DCL [µA] | ESR [mOhm] | Cap [µF] |
| Example 1 | 0.05 | 122 | 8.58 | 0.25 | 133 | 8.44 |
| Example 2 | 0.58 | 126 | 8.24 | 1.47 | 104 | 8.12 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A capacitor assembly comprising:
   a housing comprising a base extending in a lateral direction and a lid that overlies the base to define an interior cavity therebetween, wherein the lid contains an outer wall and a sidewall extending in a longitudinal direction from the outer wall toward the base, wherein a lip extends from the sidewall at an angle relative to the longitudinal direction and is hermetically sealed to the base, the lip having a peripheral edge located beyond a periphery of the sidewall;
   a capacitor element that is positioned within the interior cavity and connected to the base of the housing, the capacitor element comprising an anode formed from an anodically oxidized, sintered porous body and a solid electrolyte overlying the anode;
   an anode termination that is in electrical connection with the anode body; and
   a cathode termination that is in electrical connection with the solid electrolyte.

2. The capacitor assembly of claim 1, wherein the outer wall defines a distal end of the lid and the lip defines a proximal end of the lid.

3. The capacitor assembly of claim 1, wherein the peripheral edge of the lip is generally coplanar with a peripheral edge of the base.

4. The capacitor assembly of claim 1, wherein the peripheral edge of the lip extends in a direction that is generally perpendicular to the lateral direction of the base.

5. The capacitor assembly of claim 1, wherein the sidewall extends in a direction that is generally perpendicular to the lateral direction of the base.

6. The capacitor assembly of claim 1, wherein the lip extends from the sidewall in a direction that is generally parallel to the lateral direction of the base.

7. The capacitor assembly of claim 1, wherein the angle between the sidewall and the lip is from about 80° to about 100°.

8. The capacitor assembly of claim 1, wherein a sealing member is disposed between the lip and the base.

9. The capacitor assembly of claim 1, wherein opposing sidewalls extend from the outer wall of the lid in a longitudinal direction toward the base, wherein a lip extends from each of the sidewalls at an angle relative to the longitudinal direction and is hermetically sealed to the base, each lip having a peripheral edge located beyond a periphery of a sidewall.

10. The capacitor assembly of claim 1, wherein the interior cavity has a gaseous atmosphere that contains an inert gas.

11. The capacitor assembly of claim 10, wherein the capacitor element occupies about 30 vol. % or more of the interior cavity.

12. The capacitor assembly of claim 10, wherein inert gases constitute from about 50 wt. % to 100 wt. % of the gaseous atmosphere.

13. The capacitor assembly of claim 1, wherein the porous body is formed from tantalum or niobium oxide.

14. The capacitor assembly of claim 1, wherein the solid electrolyte includes a conductive polymer.

15. The capacitor assembly of claim 14, wherein the conductive polymer is in the form of a particle dispersion.

16. The capacitor assembly of claim 1, wherein the base and the lid are formed from a metal, plastic, ceramic, or a combination thereof.

17. The capacitor assembly of claim 16, wherein the lid is formed from a metal.

18. The capacitor assembly of claim 1, further comprising a lead that extends in a lateral direction from the porous body of the anode, wherein the lead is positioned within the interior cavity of the housing.

19. The capacitor assembly of claim 18, further comprising a connective member that contains a first portion that is positioned generally perpendicular to the lateral direction of the anode lead and connected thereto.

20. The capacitor assembly of claim 19, wherein the connective member further contains a second portion that is generally parallel to the lateral direction in which the anode lead extends.

21. The capacitor assembly of claim 20, wherein the second portion is positioned within the housing.

* * * * *